United States Patent Office 3,436,311
Patented Apr. 1, 1969

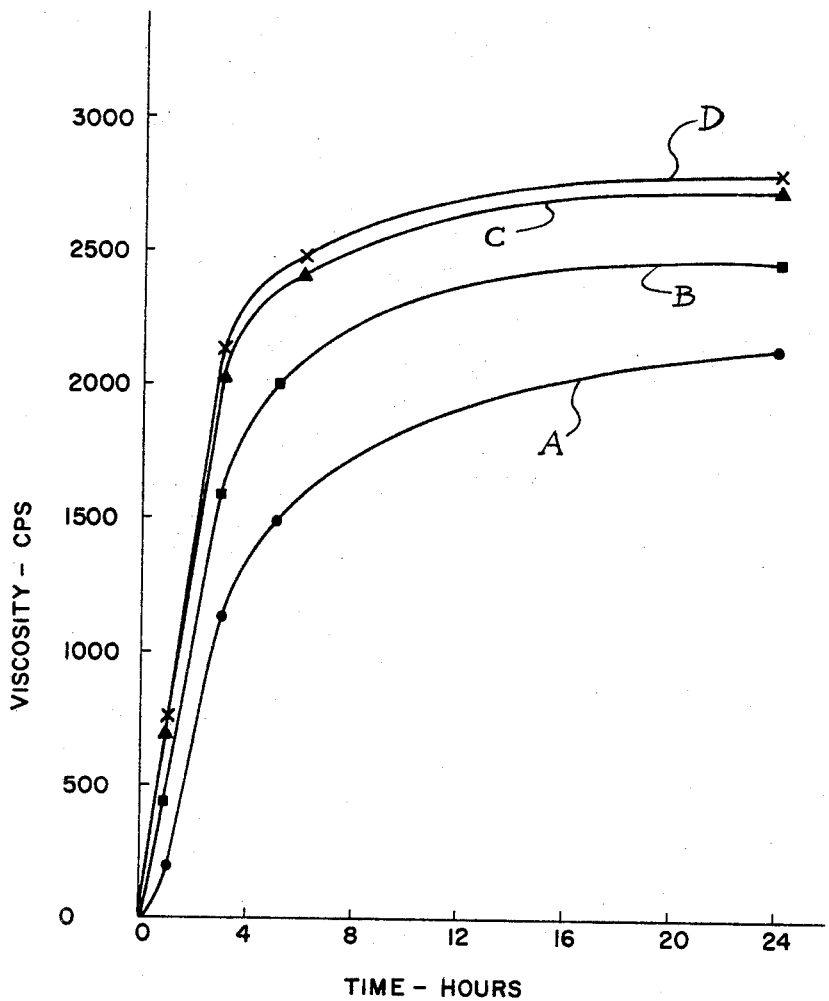

3,436,311
FUNGAL POLYSACCHARIDE COMPOSITION AND METHOD FOR MAKING SAME
Robert B. Ferguson, St. Paul, and Jack D. Westover, Burnsville, Minn., assignors to The Pillsbury Company, Minneapolis, Minn., a corporation of Delaware
Filed Feb. 28, 1966, Ser. No. 538,445
Int. Cl. C12k *1/10;* C08b *19/00*
U.S. Cl. 195—52                                              25 Claims

ABSTRACT OF THE DISCLOSURE

A dried homogenized fungal polysaccharide composition having an enhanced hydration rate is produced by subjecting an aqueous suspension of a fungal polysaccharide and hyphae to a shearing force to disassociate the hyphal aggregates in said suspension.

---

This invention relates to methods of processing polysaccharides and the products thereof, more particularly, this invention relates to the methods of enhancing the hydration rate of polysaccharides and the resultant products therefrom.

It is known that certain polysaccharides are produced by the fermentation of carbohydrate by various microorganisms. Heretofore, it has been the practice of the art to separate the microorganisms from the polysaccharide by first diluting the fermentate with water, separating the microorganisms by filtration or centrifugation and then precipitating the polysaccharide by the addition of a precipitating agent. The precipitated polysaccharide is then collected via filtration or centrifugation and dried.

The precipitated, dried polysaccharides, heretofore, have a relatively slow rate of hydration when the dried polysaccharide is subsequently added to an aqueous medium. This slow rate of hydration is undesirable as a property which limits the utility of polysaccharides in aqueous mediums.

Heretofore, the prior art methods have failed to effectively separate the polysaccharides from the other products resulting from fermentation with particular difficulty encountered in separating the polysaccharide from the organism. Consequently, neither filtration nor centrifugation are capable of effectively separating the polysaccharide from the fungal mycelium.

The figure illustrates the effect of homogenization at various homogenization pressures on the development viscosity of aqueous dispersions containing polysaccharide.

It is an object of the present invention to provide a method of effectively separating a polysaccharide from the fungal mycelium contained therein.

Another object of the invention is to provide a low cost method of separating polysaccharide from the fungi contained therein.

An additional object of the invention is to provide a method which enhances the yield of microbiologically produced polysaccharides.

A further object of the invention is to enhance the rate of hydration of microbiologically produced polysaccharides.

According to the present invention there is provided a microbiologically produced polysaccharide having an enhanced rate of hydration. The polysaccharides are prepared by providing an aqueous suspension of a polysaccharide and subjecting the aqueous suspension to a shearing force for a time sufficient to provide an aqueous solution of the polysaccharide. Upon the formation of an aqueous solution of the polysaccharide, the resultant product has greater viscosity than the polysaccharide contained in aqueous suspensions. Further processing of the aqueous solution, such as precipitation of the polysaccharide therefrom and drying, provides a polysaccharide composition having an enhanced rate of hydration. It has been further discovered that when an aqueous homogenized polysaccharide is precipitated along with the fungal hyphae and dried, the fermentation product thereof has a greater hydration rate than an unhomogenized product.

In a more limited aspect of the present invention there is provided a method which effectively separates the polysaccharide masses from the fungal mycelium. The method of separating the polysaccharides from the fungal mycelium contained therein comprises:

(a) providing an aqueous suspension of capsular bodies, said capsular bodies comprising a fungal mycelium encapsulated by a polysaccharide;

(b) subjecting the aqueous suspensions of capsular bodies to a shearing force sufficient to provide an aqueous solution of the polysaccharides; and (c) removing said polysaccharide from the aqueous solution.

The shearing force disrupts the association between the polysaccharide and fungal mycelium thus permitting extensive dissolution of the polysaccharide into the surrounding aqueous medium. The shearing force should be sufficient to disrupt associative forces between the polysaccharide molecules contained in the capsular bodies. Unexpectedly, it has been discovered that under extreme shearing, such as homogenization, an aqueous solution results without concomitant degradation to either the polysaccharide (e.g., respect to viscosity) and/or the fungal hyphae. Product recovery by employing shearing of the aqueous suspension results in increased yield, increased filter capacity, improved filtration, lessens required filter aid and enhances the viscosity of the aqueous polysaccharide compositions and dried products thereof.

Although the invention is applicable to a broad range of microbial polysaccharides, including fungal polysaccharides, it is particularly adaptable to the polysaccharides obtained from fungi-producing glucans characterized by beta 1,3 linkages in the polymeric chain (hereinafter referred to as beta 1,3 glucans). Illustrative beta 1,3 glucans, adaptable herein, are disclosed in copending application, Ser. No. 449,581 by Frank E. Halleck filed Apr. 20, 1965, now abandoned. The disclosed beta 1,3 glucans of application, Ser. No. 449,581, which are water soluble, consist essentially of polymeric backbone chain of D-glucopyranose units contiguously attached to one another via the beta 1,3 linkage with appendant glucopyranose groups contiguously attached to the polymeric chain by the beta 1,6 linkage. These beta 1,3 glucans are further characterized by a ratio of D-glucopyranose units which are free from appendant glucopyranose groups linked via the beta 1,6 linkage thereto to glucopyranose units having appendant glucopyranose groups linked via the beta 1,6 linkage (hereinafter referred to as "a ratio"). Treatment of the polysaccharides with a beta 1,3 D-glucanase derived from the organism Basiodiomycete No. 806 (collection maintained by the Microbiology Laboratory, Quartermaster Research & Engineering Center, Natick, Mass.) yields D-glucose and gentiobiose. In general, these polysaccharides usually have a ratio of at least 3:1. Typical polysaccharides have a ratio ranging from at least 3:1 to about 1:3. Preferably adaptable are those polysaccharides having a ratio ranging from at least 3:1 to about 4:3 with superior results being achieved with those polysaccharides having a ratio ranging from about 2:1 to about 3:2.

Average molecular weight of those polysaccharides is in excess of 19,000 with most of the polysaccharides having an average molecular weight in excess of 50,000 and most generally in the range of about 100,000 to about 300,000.

The invention is applicable to a wide range of microbial-produced polysaccharides including fungi fermented polysaccharides wherein the microbes are encapsulated by the polysaccharide. Illustrative fermentation polysaccharides include those obtained from fungi such as:

*Sclerotium coffeicolum* Stahel, American Type Culture Collection No. 15208; *Sclerotium delphinii* Stevens, American Type Culture Collection No. 15196; *Sclerotium delphinii* Gilman, American Type Culture Collection No. 15197; *Sclerotium rolfsii* Gilman, American Type Culture Collection No. 15195; *Sclerotium rolfsii* Barnett, American Type Culture Collection No. 15201; *Sclerotium rolfsii* Barnett, American Type Culture Collection No. 15206; *Sclerotium rolfsii* Barnett, American Type Culture Collection No. 15203; *Sclerotium delphinii* Welch/White, American Type Culture Collection No. 15200; *Corticium rolfsii* (Sacc) Curzi, American Type Culture Collection No. 15212; *Corticium rolfsii* Curzi/Ficus, American Type Culture Collection No. 15209; *Sclerotium rolfsii* QM, American Type Culture Collection No. 15202; *Sclerotium rolfsii* QM, American Type Culture Collection No. 15204; *Sclerotium delphinii* Welch/Mix, American Type Culture Collection No. 15199; *Sclerotium delphinii* Stevens I, American Type Culture Collection No. 15194; *Sclerotium rolfsii* Barnett, American Type Culture Collection No. 15205; *Stromatinia narcissi* Groves, American Type Culture Collection No. 15213; *Sclerotinia gladoli* Drayton/Massey, American Type Culture Collection No. 15207; *Corticium rolfsii* (Sacc) Curzi, American Type Culture Collection No. 15210; *Corticium rolfsii* Curzi/Balducci, American Type Culture Collection No. 15211; *Sclerotium delphinii* Jersveld/Welch, American Type Culture Collection No. 15198; *Claviceps purpurea*; *Plectania occidentalia* (NRRL 3137); *Helotium gp.* (NRRL 3129); *Pullularia pullulans*; *Penicillum chrysogenum*; *Agrobacterium tumefacians*; *Monodus subterraneus*; *Microsporum quinckeanum*; *Saccharomyces cerevisiae*; *Candida albicans*; *Cryptococcus laurentii*; *Phoseolas aureas seedlings*; *Euglena viridis*; *Euglena geniculta* and other polysaccharide producing fungi.

As disclosed in copending application, Ser. No. 449,581, polysaccharide compositions can be prepared first by inoculating a culture medium. A typical medium consists of a carbohydrate source such as dextrose, sucrose, fructose, maltose, starch, lactose, etc., a nitrogenous material (e.g., yeast extract) along with the mineral salts contained in Czapek Dox Broth. The inoculated medium is then aerated and maintained at a temperature ranging from about 25° C. to about 35° C. for about 2 to 6 days, thus providing the ferment in which the fungal mycelium is encapsulated by the polysaccharide produced thereby.

In practicing the method of the invention there is provided an aqueous suspension of the polysaccharide. The aqueous suspension should be of such a character that it lends itself to being subjected to a shearing force so that an aqueous solution can be formed therefrom. Suitable aqueous suspensions include the fermentation product wherein the fungal mycelium is encapsulated by the polysaccharide. In general, such fermentation products contain from about 90 to 99.5 weight percent water with the remaining portion consisting essentially of polysaccharide, fungal mycelium and a minor portion of unmetabolized nutrients such as carbohydrates, mineral salts and yeast extracts. Most generally, the fermentation contains from about 1 to about 5 weight percent solids of which about 50 weight percent comprises the polysaccharide and about 25 weight percent of the solid fermentate product comprises the fungal mycelium. The fermentation composition may be used directly or may be diluted with additional water or concentrated prior to the shearing action. Greater economy, however, results by subjecting the fermentation product directly to the shearing action.

As previously mentioned, the aqueous dispersion of the polysaccharide is then subjected to a shearing action sufficient to provide a solution of the polysaccharide. The shearing action is of a magnitude sufficient to disrupt the associative forces between the polysaccharide molecules and/or the fungal mycelium contained therein thus permitting dissolution of the polysaccharide in an aqueous system. To prepare a refined polysaccharide, it is desirable to avoid excessive shearing which releases the intracellular constituents of the fungus. Suitable means of providing the necessary shearing action include orifice homogenizers, Waring and Lourds Blenders or large scale machines based on this shear principle, colloid mills with course clearances, a high speed centrifugal pump throttled to provide long retention, sonic homogenizers and the like. However, Waring Blendors and the like tend to effect random shearing and must be operated over prolonged periods of time to provide the necessary shearing.

Superior results are obtained when the preparation of the aqueous solution of the polysaccharide and/or the fungal mycelium is provided by a homogenizer wherein the aqueous suspension is pumped at a high pressure through an orifice. Such devices provide positive flow paths in which all the capsular bodies are subjected to intense shear during transit therein. Surprisingly effective dispersion of the polysaccharide can thus be accomplished at a relatively low pressure. Homogenization pressures of at least 500 p.s.i. will provide a sufficient dispersion of the polysaccharide to enhance the rate of hydration, filtration, polysaccharide yield and the like. Illustrative presures range from at least 500 to about 10,000 p.s.i. Exceptional results are obtained at pressures ranging from about 1,000 to about 3,500 p.s.i. and most perferably at about 1,500 to about 3,000 p.s.i. The fact that polysaccharides which possess a high yield value as well as a high molecular weight can be homogenized was rather unexpected since it was heretofore deemed impractical if not impossible to homogenize a product having such properties.

In general, the shearing force should be sufficient to provide an aqueous solution of the polysaccharide which is filterable. For the polysaccharide encapsuled fungal mycelium compositions, the shearing effect should be exerted for a time sufficient to disassociate the hyphyl aggregates to provide a uniform dispersion of the hyphae throughout the aqueous medium. A shearing effect at least equivalent to the shear exerted by a Waring Blendor (Model CB–3 manufactured by Waring Products Corporation) at 23° C., 19,000 r.p.m. for 90 seconds is sufficient to provide a filterable aqueous solution.

A method of determining the shear force necessary to provide polysaccharide compositions of excellent hydration properties, whether in the isolated or unpurified form thereof, may be calculated from the following formula:

$$\frac{t-t_1}{t}=B$$

wherein $t$ represents the time in minutes necessary to obtain a viscosity value of 80 percent of an aqueous dispersion of the polysaccharide composition which has been blended with a Waring Blendor (Model CB–3 manufactured by Waring Products Corporation) for 1 minute at 19,000 r.p.m. at a temperature of 23° C. and allowed to hydrate for 24 hours at 23° C.; $t_1$ is the time in minutes necessary for the aqueous solution to achieve the viscosity of $t$ and B is a fraction having a value of at least 0.1, said $t$ and $t_1$ values being based upon the enhanced hydration rate of the dried polysaccharide composition. Advantageously, B has a value of at least 0.25 with superior hydrated polysaccharides being provided when B is a value of at least 0.5. The B values disclosed in the following examples were determined in the aforementioned manner.

In the figure, Curve A represents viscosity measurements (Brookfield Viscometer—23° C.—30 r.p.m.—

No. 3 Spindle) over a 24-hour time interval of a dried polysaccharide product prepared in accordance with the hereinafter procedure of Example II, Run C (i.e., 1 gram dried polysaccharide product in 100 grams of water blended 1 minute with a Waring Blendor and allowed to stand at 23° C. with periodic viscosity measurements). Curves B, C and D represent viscosity curves over a 24-hour time interval of dried polysaccharides tested under the identical test procedure as Curve A of homogenized ferments respectively prepared in accordance with Example II, Runs E, F and G. As indicated by the viscosity curves of the figure, homogenization has a pronounced effect upon the viscosity characteristics of polysaccharides in aqueous mediums (i.e., the product has an enhanced hydration rate).

Unless expressly indicated otherwise, viscosity values given herein were determined by a Brookfield Viscometer employing a No. 3 Spindle operated at 30 r.p.m. and a temperature of 23° C.

Additional information pertaining to the preparation of fungal polysaccharide may be found in copending application, Ser. No. 449,581 by Frank E. Halleck filed Apr. 20, 1965.

The following examples are illustrative of the invention:

EXAMPLE I

Preparation of the fermentation product

A sterile culture medium consisting of the following percent by weight was prepared:

| | Percent by weight |
|---|---|
| Distilled water | 94.80 |
| Glucose | 4.50 |
| Corn steep solids | 0.25 |
| NaNO$_3$ | 0.20 |
| K$_2$HPO$_4$ | 0.10 |
| MgSO$_4$·7H$_2$O | 0.15 |

The pH of the resulting medium was adjusted to 4.5 with hydrochloric acid and the medium then heated at 250° F. for 1 hour at 15 p.s.i. steam pressure. The inoculum of *Sclerotium rolfsii* Barnett, American Type Culture Collection No. 15206 was developed through 4 stages in the above medium, using shake flasks and a 10 liter mechanically agitated and aerated fermenter. 4.0 volume percent was used in each transfer with incubation at 30° C. for three days.

After the culture medium had cooled, 8.0 volume percent of the above inoculum was added to a fermenter vessel (Containing 500 gallons of the above sterile medium) equipped with a variable speed agitator, a sterile air supply and temperature control means. The medium was incubated for 60 hours at a temperature of 28° C., an agitation rate of 96 r.p.m. and an aeration rate of 0.8 vol./vol. of medium per minute. The ferment was then heated to 93° C. for 15 minutes and cooled to 23° C. to inactivate the enzymes and kill the fungi. Analysis indicated that the fermentation product contained about 96 weight percent water with the remaining portion being solids of which about 1.5 weight percent consisted of the polysaccharide.

Ten liter aliquotes of the fermentation product were further processed as follows:

Run A—Homogenized ferment.—Ten liters of the fermentation product was homogenized in a laboratory Manton Gaulin (Model 3BA), two-stage homogenizer at a pressure of 1,500 p.s.i. and a temperature of 23° C. After homogenization, 400 grams of the fermentation product was diluted with 3 parts by weight water, mixed with 35 grams of diatomaceous earth and then filtered through a laboratory bomb filter (3½" diameter stainless steel mesh—24×10 Dutch weave) at 15 p.s.i. pressure and 250° F.

The filtrate volume was cumulatively measured at 1 minute intervals. Filtration time for the entire diluted ferment was 18 minutes.

Separation of polysaccharide from the resultant filtrate was accomplished by the addition of an equal volume of isopropanol. Within 2 minutes, the polysaccharide rose to the surface as a fibrous mass which was removed therefrom by decantation. The polysaccharide was then washed twice with isopropanol and then dried in an oven at 50° C. The resultant fibrous mass of polysaccharide was then ground to a fine powder.

Run B—Unhomogenized ferment.—Run B was completed employing an identical procedure to that set forth in Run A with the exception that the diluted ferment was not homogenized with an orifice homogenizer but rather blended in a Waring Blendor (Model CB-3 manufactured by the Waring Products Corporation) (19,000 r.p.m. at 23° C.)

Microscopic examination under 30-power magnification of the diluted unhomogenized ferment from Run B prior to the addition of filter aid and filtration indicated that the polysaccharide was in the form of distinct oval capsular bodies having a maximum diameter ranging from about 1 to about 5 mm. The fungal mycelium was centrally disposed in the capsular bodies in the form of hyphyl aggregates. The capsular bodies were substantially immiscible. In contrast thereto, the diluted homogenized ferment from Run A prior to filter aid addition and filtration appeared as a homogenous mass wherein the polysaccharide was uniformly dispersed throughout the aqueous phase (i.e., the distinct capsular bodies had been destroyed by the homogenizer). The mycelium was dispersed in the form of hyphyl strands and uniformly dispersed throughout the aqueous polysaccharide medium.

Table I sets forth comparative data between Runs A and B. Viscosity measurements were conducted with a Brookfield Viscometer (30 r.p.m.—23° C.—No. 3 Spindle). For Runs A and B, 1 gram of the dried product was added to 100 grams of water and viscosity measurements were taken respectively after 1, 3 and 24 hours.

The B value of the dried homogenized polysaccharide product from Run A was determined by adding 100 grams of water to 1 gram of the dried unhomogenized polysaccharides from Run B. The resultant product was blended for 1 minute in a Waring Blendor operated at 19,000 r.p.m. at 23° C. The blended resultant product was maintained at 23° C. and subjected to periodic viscosity measurements obtained by a Brookfield Viscometer. The periodic viscosity measurements as illustrated in Curve A of the figure were then plotted over a 24-hour time interval. Viscosity reading at the completion of the 24-hour time interval was 2,160 cps. Eighty percent of the 24-hour viscosity reading (i.e., 1,728 cps.) was achieved in 456 minutes. Employing identical test conditions, a viscosity curve for Run A was plotted. It was observed that the resultant blended product from Run A achieved 80 percent of the 24-hour viscosity reading of Run B (i.e., 1,728 cps.) in 144 minutes. The B value of Run A was determined as follows:

$$\frac{456-144}{456}=0.68$$

TABLE I

| | Filtration time (minutes) | Polymer yield (grams) | Viscosity, cps. | | | B value |
|---|---|---|---|---|---|---|
| | | | 1 hr. | 3 hr. | 24 hr. | |
| Run A | 18 | 5.88 | 700 | 2,140 | 2,800 | |
| Run B | 38 | 5.02 | 200 | 1,140 | 2,160 | 0.68 |

EXAMPLE II

Homogenized ferments were prepared at various pressures according to Run A of Example I in a laboratory Manton Gaulin homogenizer. Run C was prepared per the method of the aforementioned Run B. Data in relation to homogenization pressures, filtration rate, yield and B values is set forth in Table II.

B values for the resultant dried products were determined pursuant to the test procedure of Example I employing Run C (identical to Run B) as the basis for obtaining the $t$ value. The $t_1$ value was based upon the time in minutes necessary for the blended homogenized dried products to achieve the viscosity of Run C at $t$ (time in minutes). Viscosity curves over a 24-hour test period of Runs C, E, F and G are respectively depicted by Curves A, B, C and D of the accompanying drawing.

TABLE II

| | Pressure | | Filtration time (minutes) | Polymer yield (grams) | Viscosity, cps. | | | B value |
|---|---|---|---|---|---|---|---|---|
| | 1st stage | 2nd stage | | | 1 hr. | 3 hr. | 24 hr. | |
| Run C | 0 | 0 | 38 | 5.02 | 200 | 1,140 | 2,160 | |
| Run D | 500 | 0 | 34 | 5.29 | 320 | 1,140 | 2,160 | 0.14 |
| Run E | 500 | 500 | 28 | 5.69 | 440 | 1,600 | 2,480 | 0.58 |
| Run F | 1,000 | 1,000 | 21 | 5.76 | 720 | 2,040 | 2,750 | 0.66 |
| Run G | 1,500 | 1,500 | 18 | 5.88 | 700 | 2,140 | 2,800 | 0.68 |

EXAMPLE III

Employing the ferment from Example I, Runs H and I were prepared as follows:

Run H—Homogenized polysaccharide composition.—Two hundred pounds of the ferment from Example I was homogenized via a single-stage homogenizer (Model 35C490—400 gallons per hour—manufactured by Creamery Package Manufacturing Division of St. Regis) at a pressure of 2,500 p.s.i. and at a temperature of 23° C. Separation of the soluble fermentation products from the polysaccharide and accompanying hyphae contained in the homogenized ferment was achieved by adding an equal volume of isopropanol thereto, thus forming an aqueous portion containing the inorganic ferment products and a fibrous mass containing the polysaccharide and hyphae. The fibrous mass was separated from the aqueous portion via a dewatering device and the separated fibrous mass was washed 2 times with isopropanal, dried in an oven at 50° C. and then ground.

Run I—Unhomogenized polysaccharide composition.—Under identical conditions as the aforementioned Run H with the exception that the ferment was not homogenized by the single-stage homogenizer.

Comparative data between the viscosity measurements at several time intervals (per Example I) is disclosed in the following Table III. The $t$ value was determined on the basis of the dried composition of Run I per the test procedure of Example I (1 gram of dried product per 100 grams of water).

TABLE III

| Time (hours) | Viscosity, cps. | |
|---|---|---|
| | Run H[1] | Run I |
| 1 | 1,720 | 1,000 |
| 5 | 1,800 | 1,220 |
| 24 | 1,860 | 1,420 |

[1] B value for H=0.83.

EXAMPLE IV

A dried polysaccharide prepared in accordance with the aforementioned Run B is processed as follows:

Run J—Homogenized reconstituted dry polysaccharide composition.—Two pounds of the dried polysaccharide prepared in accordance with Example I, Run A, is blended in a high speed mixer for 3 minutes with 200 pounds of water. The resultant blended product is subjected to the homogenization process as disclosed in Run A.

Run K—Unhomogenized reconstituted dry polysaccharide composition.—After blending for 3 minutes in a high speed mixed per Run J, the dried product, however, is not homogenized but processed directly to the dry form according to the method of Run J.

The B value of Run J is greater than that of Run K.

EXAMPLE V

Ten liters of the fermentation product prepared in accordance with Example I were processed by blending in a Waring Blendor maintained at 23° C. operated at 19,000 r.p.m. for 90 seconds. Another 10 liters of the fermentation product of Example I was not blended. Four hundred gram portions of the blended fermentation product and the unblended fermentation product were diluted with 3 parts by weight of water and subjected to filtration with the aforementioned laboratory bomb filter (at 23° C.). It was observed that the aqueous portion of the blended product passed through the filter whereas the unblended fermentation product clogged the filter, preventing the filtration thereof.

What is claimed is:
1. A method of providing a filterable polysaccharide composition from a microbial-produced polysaccharide comprising the steps of:
    (a) providing an aqueous suspension of capsular bodies comprised of fungal hyphyl aggregates encapsulated by a polysaccharide; and
    (b) subjecting said aqueous suspension of capsular bodies to a shearing force and for a time sufficient to disassociate the hyphyl aggregates and provide a uniform dispersion of the hyphyl filaments therein.
2. The method according to claim 1 wherein the polysaccharide has an average molecular weight of at least 19,000 and the polysaccharide is composed of a polymeric chain of anhydro D-glucopyranose units linked by a beta 1,3 linkage.
3. The method according to claim 2 wherein the polysaccharide consists essentially of a polymeric chain of anhydro D-glucopyranose units contiguously attached to one another via a beta 1,3 linkage with appendant anhydro glucopyranose groups contiguously attached to the polymeric chain by a beta 1,6 linkage wherein the ratio of anhydro D-glucopyranose units free from appendant anhydro D-glucopyranose groups to those anhydro D-glucopyranose units having appendant anhydro glucopyranose groups, is at least 3:1.
4. The method according to claim 3 comprising the additional steps of precipitating the polysaccharide contained in said aqueous solution, recovering the precipitated polysaccharide and drying the polysaccharide.
5. The method according to claim 3 wherein the polysaccharide has a ratio ranging from 3:1 to about 1:3 and an average molecular weight in excess of 50,000.
6. The method according to claim 5 wherein the ratio ranges from about 2:1 to about 3:2 and the polysaccharide has an average molecular weight in excess of 100,000.
7. The method according to claim 6 wherein the ratio is about 2:1.
8. A method for enhancing the rate of hydration of a fungal polysaccharide having a molecular weight of at least 19,000, said method comprising:
    (a) providing an aqueous suspension of a fungal polysaccharide; and,
    (b) subjecting the aqueous suspension of the polysaccharide to a shearing force and for a time sufficient to provide an aqueous solution, said aqueous solution being characterized by a B value of at least 0.1 as ascertained by the following relationship:

$$\frac{t-t_1}{t}=B$$

wherein $t$ is the time in minutes necessary to obtain 80 percent of the 24-hour viscosity value of the dried nonhomogenized fungal polysaccharide when 1 gram of the dried nonhomogenized polysaccharide composition is dispersed in 100 grams of water and subjected to 1 minute blending by a Waring Blendor operated at 19,000 r.p.m. at 23° C. and allowed to remain for 24 hours at 23° C., $t_1$ is the time in minutes necessary for the dried homogenized polysaccharide composition to obtain 80 percent of the 24-hour viscosity value of the polysaccharide produced by the fungi when 1 gram of the dried homogenized polysaccharide composition is dispersed in 100 grams of water and subjected to 1 minute blending by a Waring Blendor operated at 19,000 r.p.m. and maintained at 23° C., B is a fraction having a value of at least 0.10, said viscosity being determined by a Brookfield Viscometer employing a No. 3 Spindle operated at 30 r.p.m. and maintained at a temperature of 23° C.

9. The method according to claim 8 wherein the polysaccharide comprises a polymeric chain of anhydro D-glucopyranose units linked beta 1,3.

10. The method according to claim 9 wherein the polysaccharide consists essentially of a polymeric chain of anhydro D-glucopyranose units contiguously attached to one another via beta 1,3 linkage with appendant anhydro glucopyranose groups contiguously attached to the polymeric chain by a beta 1,6 linkage wherein the ratio of anhydro D-glucopyranose units free from appendant anhydro glucopyranose groups to those anhydro D-glucopyranose units having appendant glucopyranose groups is at least 3:1.

11. The method according to claim 10 wherein the aqueous suspension contains capsular bodies, said capsular bodies consisting essentially of fungal mycelium encapsulated by polysaccharide masses, said polysaccharide masses having an average molecular weight of at least 50,000 and a ratio ranging from about 2:1 to about 3:2 and B is a fraction having a value of at least 0.25.

12. The method according to claim 11 comprising the additional step of recovering the polysaccharide and fungal filaments from the aqueous solution.

13. The method according to claim 10 comprising the additional step of separating a major portion of the polysaccharide from a major portion of the fungal filaments.

14. The method according to claim 13 comprising the additional steps of recovering the polysaccharide from the aqueous medium and drying the polysaccharide.

15. The method according to claim 10 wherein the polysaccharide has a ratio ranging from 3:1 to about 1:3 and an average molecular weight in excess of 50,000.

16. The method according to claim 11 wherein the polysaccharide has an average molecular weight of at least 100,000 and B is a fraction having a value of at least 0.50.

17. A dried homogenized polysaccharide composition having an enhanced hydration rate in comparison to the nonhomogenized dried fungal polysaccharide thereof, said composition comprising fungal filaments and a polysaccharide having an average molecular weight of at least 19,000; said polysaccharide consisting essentially of a polymeric chain of anhydro D-glucopyranose units contiguously attached to one another by a beta 1,3 linkage with appendant anhydro glucopyranose groups contiguously attached to the polymeric chain by a beta 1,6 linkage wherein the ratio of anhydro D-glucopyranose units free from appendant anhydro glucopyranose groups to those anhydro D-glucopyranose units having appendant anhydro glucopyranose groups, is at least 3:1, said composition being further characterized by the following relationship:

$$\frac{t-t_1}{t}=B$$

wherein $t$ is the time in minutes necessary to obtain 80 percent of the 24-hour viscosity value of the dried nonhomogenized fungal polysaccharide when 1 gram of the dried nonhomogenized polysaccharide composition is dispersed in 100 grams of water and subjected to 1 minute blending by a Waring Blendor operated at 19,000 r.p.m. at 23° C. and allowed to remain for 24 hours at 23° C., $t_1$ is the time in minutes necessary for the dried homogenized polysaccharide composition to obtain 80 percent of the 24-hour viscosity value of the polysaccharide produced by the fungi when 1 gram of the dried homogenized polysaccharide composition is dispersed in 100 grams of water and subjected to 1 minute blending by a Waring Blendor operated at 19,000 r.p.m. and maintained at 23° C., B is a fraction having a value of at least 0.10, said viscosity being determined by a Brookfield Viscometer employing a No. 3 Spindle operated at 30 r.p.m. and maintained at a temperature of 23° C.

18. The composition according to claim 17 wherein a major portion of the dried polysaccharide composition consists essentially of fungal filaments and polysaccharide and the polysaccharide has a ratio ranging from 3:1 to about 1:3 and an average molecular weight is in excess of 50,000.

19. The composition according to claim 18 wherein at least 80 percent of the dry products consists essentially of fungal filaments and polysaccharide.

20. The composition according to claim 19 wherein the amount of polysaccharide contained in said dried composition is at least 80 percent by weight.

21. The composition according to claim 18 wherein the polysaccharide has a ratio of about 2:1 to about 3:2 and the average molecular weight is in excess of 100,000 and B is at least 0.25.

22. The composition according to claim 21 wherein a major portion of the dried polysaccharide composition consists of the polysaccharide.

23. The composition according to claim 22 wherein B is at least 0.50.

24. The composition according to claim 22 wherein at least 80 percent by weight of the dried polysaccharide composition consists of the polysaccharide.

25. The composition according to claim 23 wherein the dried polysaccharide consists essentially of a polysaccharide having a ratio of about 2:1.

References Cited

UNITED STATES PATENTS

| | | | |
|---|---|---|---|
| 2,801,955 | 8/1957 | Rutenberg et al. | 260—209 |
| 2,871,235 | 1/1959 | De Jilovice | 260—209 |
| 3,019,138 | 1/1962 | Doggett et al. | 260—209 |
| 3,205,125 | 9/1965 | Opie et al. | 260—209 |
| 3,301,848 | 1/1967 | Halleck | 260—209 |

LIONEL M. SHAPIRO, *Primary Examiner.*

U.S. Cl. X.R.

195—31; 260—209